(12) United States Patent
Chynoweth et al.

(10) Patent No.: US 9,582,275 B2
(45) Date of Patent: Feb. 28, 2017

(54) METHOD AND APPARATUS FOR OBTAINING A CALL STACK TO AN EVENT OF INTEREST AND ANALYZING THE SAME

(75) Inventors: Michael W. Chynoweth, Rio Rancho, NM (US); Peggy J. Irelan, Chandler, AZ (US); Matthew C. Merten, Hillsboro, OR (US); Seung-Woo Kim, Dupont, WA (US); Laura A. Knauth, Portland, OR (US); Stanislav Bratanov, Nizhniy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1351 days.

(21) Appl. No.: 13/118,766

(22) Filed: May 31, 2011

(65) Prior Publication Data

US 2012/0311307 A1    Dec. 6, 2012

(51) Int. Cl.
| | | |
|---|---|---|
| G06F 15/00 | (2006.01) | |
| G06F 7/38 | (2006.01) | |
| G06F 9/00 | (2006.01) | |
| G06F 9/44 | (2006.01) | |
| G06F 9/30 | (2006.01) | |
| G06F 11/34 | (2006.01) | |

(52) U.S. Cl.
CPC ...... *G06F 9/30054* (2013.01); *G06F 9/30087* (2013.01); *G06F 11/348* (2013.01); *G06F 11/3409* (2013.01); *G06F 11/3476* (2013.01)

(58) Field of Classification Search
None
See application file for complete search history.

(56) References Cited

U.S. PATENT DOCUMENTS

| | | | |
|---|---|---|---|
| 2005/0210454 A1* | 9/2005 | DeWitt et al. | 717/133 |
| 2006/0230391 A1* | 10/2006 | Alexander et al. | 717/130 |
| 2007/0214342 A1* | 9/2007 | Newburn et al. | 712/216 |
| 2007/0260942 A1 | 11/2007 | Rajwar et al. | |
| 2008/0005504 A1 | 1/2008 | Barnes et al. | |
| 2008/0065864 A1 | 3/2008 | Akkary et al. | |
| 2008/0209406 A1* | 8/2008 | O'Callahan | G06F 11/3476 717/131 |
| 2009/0292906 A1* | 11/2009 | Codrescu | G06F 9/30101 712/226 |
| 2010/0223598 A1* | 9/2010 | Levine et al. | 717/128 |
| 2010/0250809 A1* | 9/2010 | Ramesh et al. | 710/200 |

OTHER PUBLICATIONS

Ditzel et al. (Register Allocation for Free: The C Machine Stack Cache, Apr. 1982, pp. 48-56).*

(Continued)

*Primary Examiner* — George Giroux
(74) *Attorney, Agent, or Firm* — Trop, Pruner & Hu, P.C.

(57) ABSTRACT

In one embodiment, a processor includes a performance monitor including a last branch record (LBR) stack to store a call stack to an event of interest, where the call stack is collected responsive to a trigger for the event. The processor further includes logic to control the LBR stack to operate in a call stack mode such that an entry to a call instruction for a leaf function is cleared on return from the leaf function. Other embodiments are described and claimed.

24 Claims, 9 Drawing Sheets

(56) References Cited

OTHER PUBLICATIONS

U.S. Appl. No. 12/845,554, entitled, "Last Branch Record Indicators For Transactional Memory," filed Jul. 28, 2010, by Ravi Rajwar, et al.
wikipedia.org, "Call Stack," http://en.wikipedia.org/wiki/Call_stack, (version of Mar. 31, 2011), 6 pages.
Michael Chynoweth, et al., "Implementing Scalable Atomic Locks for Multi-Core Intel® EM64T and IA32 Architectures," Intel Software Network, Nov. 9, 2009, 8 pages.
Intel Programming Guide, "Intel® Microarchitecture Codename Nehalem Performance Monitoring Unit Programming Guide (Nehalem Core PMU)," Oct. 11, 2010, 59 pages.

\* cited by examiner

METHOD AND APPARATUS FOR OBTAINING A CALL STACK TO AN EVENT OF INTEREST AND ANALYZING THE SAME

BACKGROUND

As technology advances, computer systems include greater numbers of processors in the form of multiprocessor systems, e.g., via one or more multi-core processors, that can execute multiple threads concurrently. The ever increasing number of cores and logical processors in a system enables more software threads to be executed. While this trend benefits users in the form of increased processing power and computation ability, difficulties can arise. For example, the increase in the number of software threads that may be executed simultaneously can create problems with synchronizing data shared among the software threads. One common solution to accessing shared data in multiple core or multiple logical processor systems uses locks to guarantee mutual exclusion across simultaneous accesses to shared data. Such locking mechanisms can be detrimental to system performance however and may cause program failures, e.g., due to lock contention or other unwanted behavior. Other adverse effects of multiple threads exist, and in addition imprecise software can lead to performance impacts or errors in execution.

Accordingly, software performance investigations can occur to determine a cause of a problem or to improve software performance. Some analysis and debugging can be aided by a performance monitoring unit of a processor. However, such analysis often requires that a developer understands how the software arrived at a software performance bottleneck or a point of interest. For example, it is usually not sufficient to provide data that a given function is causing eviction of large amounts of the contents of a cache memory, known as cache trashing. Investigating a software bottleneck often requires a call stack to the function that resulted in a large number of cache line replacements. The most typical solution to this problem is for a software performance analysis tool to output the most frequent call stacks to a function of interest utilizing instrumentation or other intrusive methodologies. But such methodologies suffer from various drawbacks, including complexity, intrusiveness, and obtaining more information than needed for debug or other purposes.

DETAILED DESCRIPTION

Figure 1:
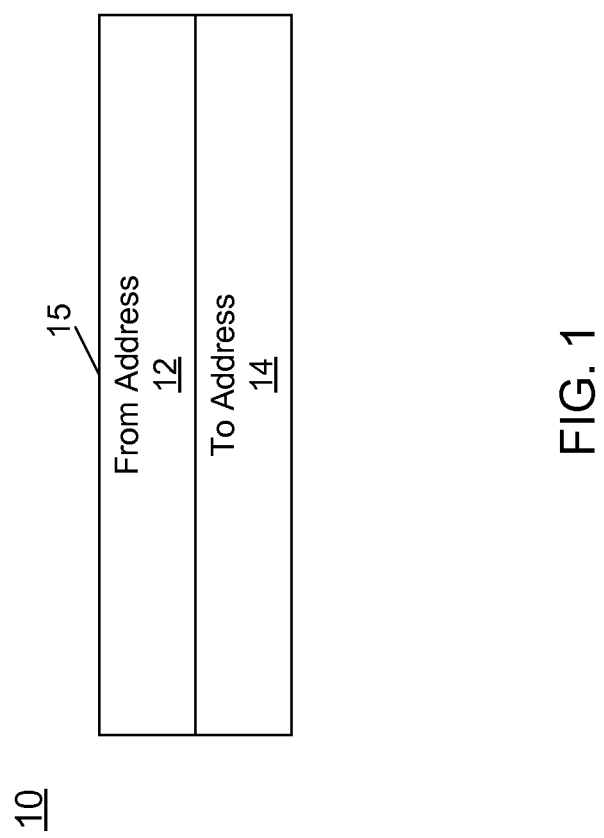
FIG. 1 is a block diagram of last branch register pairs in accordance with an embodiment of the present invention.

Embodiments may use processor performance monitoring circuitry to directly obtain a call stack to an event of interest. This information obtained may be stored in various locations in different embodiments. For example, in some implementations a processor may provide for temporary storage of such information via a given storage structure as a cache memory, buffer, table or so forth. For purposes of discussion herein, a specific performance recording facility available in a processor, namely a last branch record (LBR) storage unit may be used to provide an inexpensive and accurate call stack to any collected performance monitoring event. However understand the scope of the present invention is not limited in this regard and as mentioned above, embodiments can store the desired information in many different types of storage units, both internal and external to a processor.

This LBR structure, which may be within the performance monitor of a processor, can maintain a call stack for the purpose of performance monitoring. This provides for a very unobtrusive methodology to obtain an exact call stack to an event of interest, and can be realized via a platform and OS independent methodology. Note that this LBR call stack is independent from the actual system call stack or other stacks stored in memory and used during program execution. Such conventional call stacks are data structures that store information about active subroutines or functions of a program. Various information can be stored in these conventional stacks including storage of a return address, as well as providing for storage for local data parameters and so forth. A conventional system call stack can be formed of multiple stack frames, each of which stores a data structure containing subroutine state information. Each stack frame corresponds to a call to a subroutine that has not yet terminated with a return. The stack frame usually includes information such as arguments (parameter values) passed to the routine (if any), the return address to the calling routine, and space for the local variables of the routine (if any), among other information.

Instead, as used herein the terms "call stack mode," "LBR call stack," or more generally "call stack" are used to denote storage of function calling information in a given storage location such as available last branch record recording facilities of a processor (and potentially additional storage of such information in a backing store) and which may only include call information (e.g., to and from information), but not other information of a conventional call stack such as passed parameters or so forth as obtained by a debugger.

Note as used herein call and return instructions may constitute branch operations. In many embodiments, a call instruction may store the next sequential instruction pointer (IP) in a system call stack, and a return instruction is a branch to that stored address once the function is complete.

When collecting information from a performance monitor for an event of interest in accordance with an embodiment of the present invention, the LBRs, which may be implemented as a register stack and configured as a circular buffer, may be programmed to operate as a call stack. In turn, this call stack can be read by a collection driver that is triggered when an event overflows. By reading the contents of the LBRs at this collection point, a call stack to the event(s) being collected can be obtained.

Note that event overflow occurs when an event reaches a preprogrammed number of instances defined by a sample after value (SAV), which can be stored in a configuration register of the performance monitor. During an event overflow, an interrupt is incurred and a collection driver executed responsive to this interrupt can capture information surrounding the event. As a result, a call stack can be collected at a very low overhead to the triggered event along with other information collected by the driver, such as the values present in various counters and so forth.

In the LBR call stack mode, whenever a call instruction is encountered during application execution the instruction address of the call (source address) and the destination address are pushed onto the LBR stack (that is, the value is written into an entry). The addresses are the popped off the stack (that is, these values are cleared) when a matching return is encountered, so that completed and thus stale functions do not consume valuable LBR resources (in some embodiments, a LBR unit may include 16 register pairs). In various embodiments, using the LBR as a call stack can serve multiple purposes: it prevents leaf functions that have already returned from utilizing valuable entries in the LBR, since as discussed above in the call stack mode the LBR clears any functions that return; it minimizes the entries used in the LBR since calls and returns do not both need to be tracked in the LBR entries; and it allows a software performance analysis tool to obtain call stacks to any performance monitoring event of interest. As such, this mechanism can be used to preserve a sequence of nested function calls.

Thus in various embodiments, in call stack mode an LBR uses fewer entries than during typical LBR operation to present a call stack to any event of interest. Take for example a simple two-level function call where a call stack is desired to FuncE which contains a point of interest. In the pseudo code below in Table 1, functions FuncB, FuncC and FuncD are leaf functions which are called by and return to FuncA before it calls the FuncE function, which includes a point of interest.

TABLE 1

```
FuncA{
    FuncB
    FuncC
    FuncD
    FuncE <= Point of Interest
}
```

Without an embodiment of the present invention, the LBR would be polluted with the calls and returns of the leaf functions FuncB, FuncC, and FuncD that do not serve any purpose in obtaining a call stack to the point of interest. Instead, using an embodiment, only the calls for functions A and E remain stored in the LBR stack. As such, desired information can be stored in a fewer number of entries.

In general, last branch recording facilities may store branch records in a set of machine or model specific registers (MSRs). For example, a processor may include a LBR stack of MSRs for storing information regarding the most recently taken branches of any type, e.g., function calls and returns, jumps, interrupts, exceptions, and so forth. A branch record or entry includes a pair of registers, one of which to store a branch-from instruction address and the other to store a branch-to instruction address which may be linear addresses, in one embodiment. In some implementations, the registers may be automatically read, while in other embodiments a control signal may cause the LBR stack to send branch records as branch trace messages (BTMs) to a selected destination location. Note that operation of LBR registers can be controlled to be enabled or disabled and further controlled to operate in a call stack mode. For example, an LBR flag may be present in a debug control MSR to enable the processor to automatically record branch records for taken branches and another flag may enable the call stack mode.

The number of MSRs in the LBR stack can vary in different embodiments. For example, in different implementations, the size of the LBR stack may be 4, 8 or 16, although the scope of the present invention is not limited in this regard. As described above, last branch recording mechanisms may track not only branch instructions (like jumps, loops and call instructions), but also other operations that cause a change in the instruction pointer (like external interrupts, traps and faults). In various embodiments, output filtering options can be available for the LBRs so that only certain types of instructions can be tracked. For example, the LBRs can be controlled to only store information regarding function calls and returns. In addition, embodiments can provide a call stack mode to enable the LBRs to be used as a call stack such that information regarding completed leaf functions is automatically cleared to provide a more accurate call stack to an event of interest. As such, this call stack can be closely associated with a triggering of a performance monitoring operation responsive to an event of interest.

Referring now to FIG. 1, shown is a block diagram of a LBR register pair in accordance with an embodiment of the present invention. As shown in FIG. 1, register pair 10 may include two MSRs, namely a first MSR 12 and a second MSR 14. As seen, MSR 12 may store a source address. That is, this register may store a source address of a recent branch, namely the "from" address at which a branch occurs. In turn, register 14 may store a destination address, namely a "to" address to which control is passed by the branch. In addition to an address field 15 that stores an instruction pointer address, additional fields may be present in these registers, although not shown in FIG. 1 for ease of illustration. For example, in some embodiments a prediction indicator may be provided that, when set indicates that the branch taken was predicted correctly. Otherwise, the indicator may be cleared to indicate that the branch was mispredicted. In some embodiments, additional information such as hardware lock elision (HLE) bits and time stamp information may similarly be stored as additional status information. In still further embodiments, additional information such as a change in information from a previous entry such as timestamps, instructions retired or so forth can be present.

In one embodiment, each branch record or entry includes two linear addresses, which represent the "from" and "to" instruction pointers for a branch, interrupt, or exception. The contents of the from and to addresses may differ, depending on the source of the branch. Where the record is for a taken branch, the "from" address is the address of the branch instruction and the "to" address is the target instruction of the branch. Where the record is for an interrupt, the "from" address is the return instruction pointer (RIP) saved for the interrupt and the "to" address is the address of the first instruction in the interrupt handler routine. The RIP is the linear address of the next instruction to be executed upon returning from the interrupt handler. Where the record is for an exception, the "from" address is the linear address of the instruction that caused the exception to be generated and the "to" address is the address of the first instruction in the exception handler routine.

While shown with only this register pair in the embodiment of FIG. 1, understand that a LBR stack may include many more pairs, and that each register pair may be referred to as an entry that stores information associated with a given branch instruction. In addition, the structure, arrangement and information included in the LBRs may be different in different embodiments.

In some embodiments a last branch record top-of-stack (TOS) pointer may store a pointer to the MSR in the LBR stack that contains the most recent branch, interrupt, or exception recorded. As will be described below, in some embodiments a debug store (DS) mechanism may store BTMs in a branch trace store (BTS) which may be a backing store that is located in a given portion of a memory hierarchy such as a hardware buffer, cache, or system memory. In one embodiment, when a BTS flag in a configuration register is set, a branch record is stored in the BTS buffer in the DS save area whenever a taken branch, interrupt, or exception is detected.

In some embodiments, filtering of last branch records can be realized via a LBR select register that may provide fields to specify the conditions of subsets of branches that will not be captured in the LBR. For example, this register may include fields to filter branches occurring in predetermined privilege levels, filter other branch flows to thus only store information regarding function calls or so forth.

Figure 2:
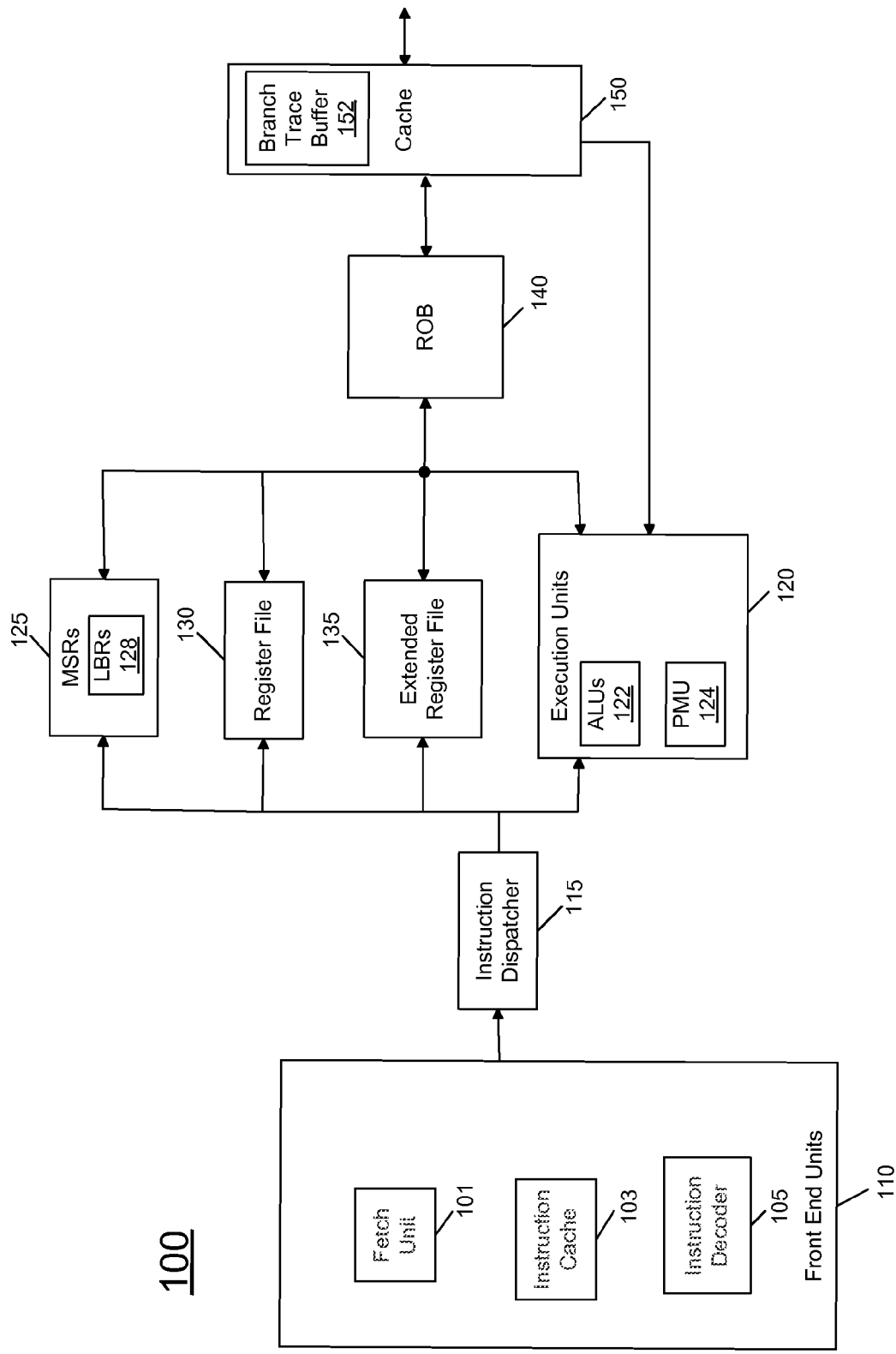
FIG. 2 is a block diagram of a processor core in accordance with one embodiment of the present invention.

Referring now to FIG. 2, shown is a block diagram of a processor core in accordance with one embodiment of the present invention. As shown in FIG. 2, processor core 100 may be a multi-stage pipelined out-of-order processor. Processor core 100 is shown with a relatively simplified view in FIG. 2 to illustrate various features used in connection with branch record reporting in accordance with an embodiment of the present invention.

As shown in FIG. 2, core 100 includes front end units 110, which may be used to fetch instructions to be executed and prepare them for use later in the processor. For example, front end units 110 may include a fetch unit 101, an instruction cache 103, and an instruction decoder 105. In some implementations, front end units 110 may further include a trace cache, along with microcode storage as well as a micro-operation storage. Fetch unit 101 may fetch macro-instructions, e.g., from memory or instruction cache 103, and feed them to instruction decoder 105 to decode them into primitives, i.e., micro-operations for execution by the processor.

Coupled between front end units 110 and execution units 120 is an instruction dispatcher 115 which can be implemented as out-of-order logic in out-of-order implementations to receive the micro-instructions and prepare them for execution. More specifically instruction dispatcher 115 may include various buffers to allocate various resources needed for execution, as well as to provide renaming of logical registers onto storage locations within various register files such as register file 130 and extended register file 135. Register file 130 may include separate register files for integer and floating point operations. Extended register file 135 may provide storage for vector-sized units, e.g., 256 or 512 bits per register.

As further seen in FIG. 2, processor 100 may include a set of MSRs 125. As discussed above, various types of model specific information may be stored in such registers. In the embodiment of FIG. 2, shown is a set of LBRs 128 which as discussed above may store information regarding branches taken during execution of code, and that can be controlled to operate in a call stack mode to efficiently obtain a call stack to an event of interest. These or similar registers may further include information regarding other execution occurrences such as interrupts, traps, exceptions and so forth.

Various resources may be present in execution units 120, including, for example, various integer, floating point, and single instruction multiple data (SIMD) logic units, among other specialized hardware. For example, such execution units may include one or more arithmetic logic units (ALUs) 122. In addition, execution units may further include a performance monitoring unit (PMU) 124. In various embodiments, PMU 124 may be used to control obtaining of various information, e.g., profiling counters, information in MSRs and so forth. In particular implementations here, PMU 124 or other such logic may be used to control recording of call stack information in LBR 128 and to further obtain such information for further use, e.g., on triggering of a particular event in the PMU. Results of execution in the execution units may be provided to retirement logic, namely a reorder buffer (ROB) 140. More specifically, ROB 140 may include various arrays and logic to receive information associated with instructions that are executed. This information is then examined by ROB 140 to determine whether the instructions can be validly retired and result data committed to the architectural state of the processor, or whether one or more exceptions occurred that prevent a proper retirement of the instructions. Of course, ROB 140 may handle other operations associated with retirement.

As shown in FIG. 2, ROB 140 is coupled to a cache 150 which, in one embodiment may be a low level cache (e.g., an L1 cache) although the scope of the present invention is not limited in this regard. As seen, cache 150 in one embodiment may include a branch trace buffer 152 that may store branch information, e.g., received from LBRs 128. For example, PMU 124 may control the creation and sending of branch target messages from LBR 128 to branch trace buffer 152. From here, the information may be accessed, e.g., via a perform monitoring tool or so forth to enable analysis of information regarding a call stack obtained upon an event trigger in accordance with an embodiment of the present invention. Also, execution units 120 can be directly coupled to cache 150. While shown with this high level in the embodiment of FIG. 2, understand the scope of the present invention is not limited in this regard.

Figure 3:
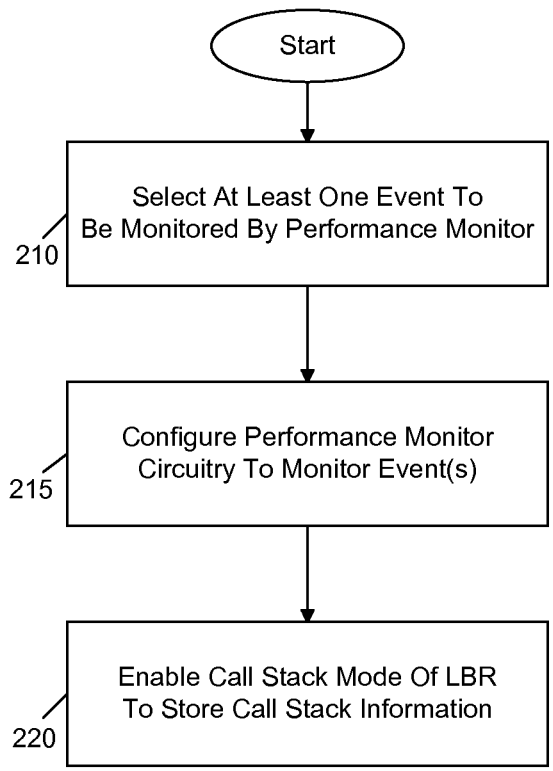
FIG. 3 is a flow diagram of a method for configuring a last branch recording facility in accordance with an embodiment the present invention.

Referring now to FIG. 3, shown is a flow diagram of a method in accordance with an embodiment the present invention. More specifically, method 200 of FIG. 3 may be used to set up a performance monitor to monitor the performance of one or more events of interest. For example, the event of interest may correspond to an indication of contention for a particular memory location such as a location of a lock. This indication of contention can be represented by occurrences of a snoop signal from a given processor core (or more particularly a cache associated with the processor core) to indicate that the associated cache has stored a modified version of the cache line (a so-called HITM response). Thus one event of interest that can be counted using a performance monitor unit is HITM occurrences on a given cache line corresponding to a lock. Other examples of stacks to events may include obtaining call stacks to a far branch event that can provide call stacks to common user-level to privileged-level transactions, or call stacks to last level cache replacements, which may provide calls to libraries that trash the cache the most. Or a developer may choose to capture calls to a function such as memory that cause the most cache misses. Of course, many other usage cases are possible. Still other examples include common leaf functions with many callers, especially library functions, or any event that is related to a performance degradation. For example, assume a math function is taking a lot of assists (such as a denormal where the hardware uses assistance from software routines to complete a calculation). Once could use an embodiment to find the part of the application that is requesting the frequently assisted math operations. Or an embodiment can be used in connection with memory disambiguation nukes (particular parts of programs where the memory system reorders loads and stores, but finds that the loads and stores should actually feed each other and should be done in order).

Thus referring to FIG. 3, method 200 may begin by selecting at least one event to be monitored by the performance monitor (block 210). In this example, the event to be monitored can correspond to HITM responses for a given memory location. Thus as shown in FIG. 3 control passes to block 215 where performance monitor circuitry may be configured to monitor for one or more events. As an example, a performance monitor counter can be configured to count occurrences of such HITM messages for the given cache line. In addition, a threshold level can be set for this counter. In one embodiment, this threshold can be stored as a save after value in a configuration register of the performance monitor. Based on this configuration, during operation a collection performance monitor interrupt may occur to trigger execution of a collection driver to thus collect values stored in various portions of the performance monitor including this counter, in addition to an LBR call stack in accordance with an embodiment of the present invention.

Referring still to FIG. 3, after configuring the performance monitor circuitry to monitor for a given one or more events, further configuration may occur with regard to the LBR. More specifically, the LBR may be configured to operate according to a call stack mode as described herein such that the LBR can be configured to filter out branches other than function calls, and furthermore to operate to clear entries associated with completed functions such as leaf functions (block 220). Thus at this point, both a performance monitor and its associated LBR stack can be configured for performance monitoring and LBR operation in accordance with an embodiment of the present invention.

Figure 4:
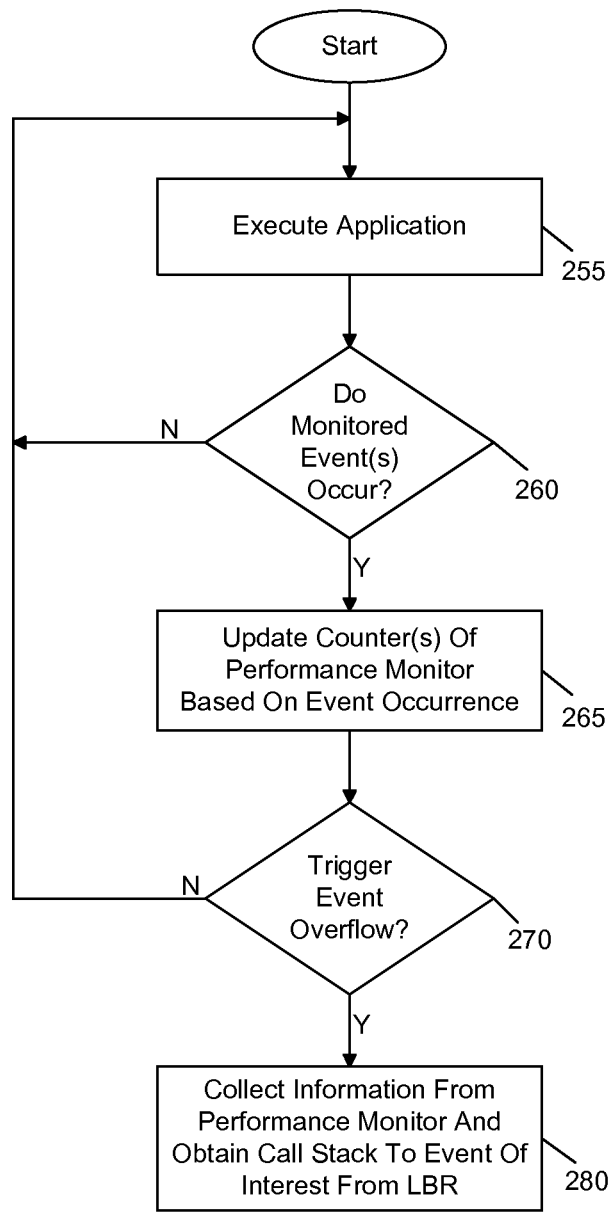
FIG. 4 is a flow diagram of a high level method for operating a processor to perform performance monitoring and call stack gathering in accordance with one embodiment of the present invention.

Referring now to FIG. 4, shown is a flow diagram of a high level method for operating a processor to perform performance monitoring and call stack gathering in accordance with one embodiment of the present invention. As seen in FIG. 4, method 250 may begin by executing an application (block 255). For example, the application may be a given user-level application such as a multi-threaded application that provides mutual exclusivity to various data structures via use of locking mechanisms.

FIG. 4 further shows the interaction of performance monitoring operations during execution of this program. Specifically at diamond 260 it may be determined whether a monitored event occurs. As discussed above in one example a monitored event may correspond to a HITM message received for a given cache line. Normal application execution may thus continue if no such monitored event occurs. If instead a monitored event occurs, control passes to block 265, where one or more counters of the performance monitor may be updated based on event occurrence.

Then at diamond 270 it may be determined whether this monitored event triggers an event overflow. An event overflow occurs when a count of the monitored event or events occurring within the processor reaches a particular threshold, e.g., corresponding to a sample after value. If no such trigger event has occurred, control passes back to block 255 for further execution of the application.

If instead it is determined that a trigger event has occurred, control passes to block 280, where various information may be collected from the performance monitor and in addition, a call stack to an event of interest may be obtained from the LBR. While the scope of the present invention is not limited in this regard, in various embodiments this collection may be performed by a collection driver that is triggered responsive to the event overflow. Note that in addition to obtaining information from the performance monitor, a call stack can be obtained from the LBR stack for the event of interest. That is, although not shown specifically in FIG. 4, understand that since the LBR stack is configured for a call stack mode, on each function call, branch information is stored into a given entry of the LBR unit. And for each return from a function, the corresponding call information stored in the LBR is cleared, such that at the time of collection, a call stack to the event of interest and no other information is present and stored in the LBR unit. While shown with this particular implementation in the embodiment of FIG. 4, understand the scope of the present invention is not limited in this regard.

Figure 5:
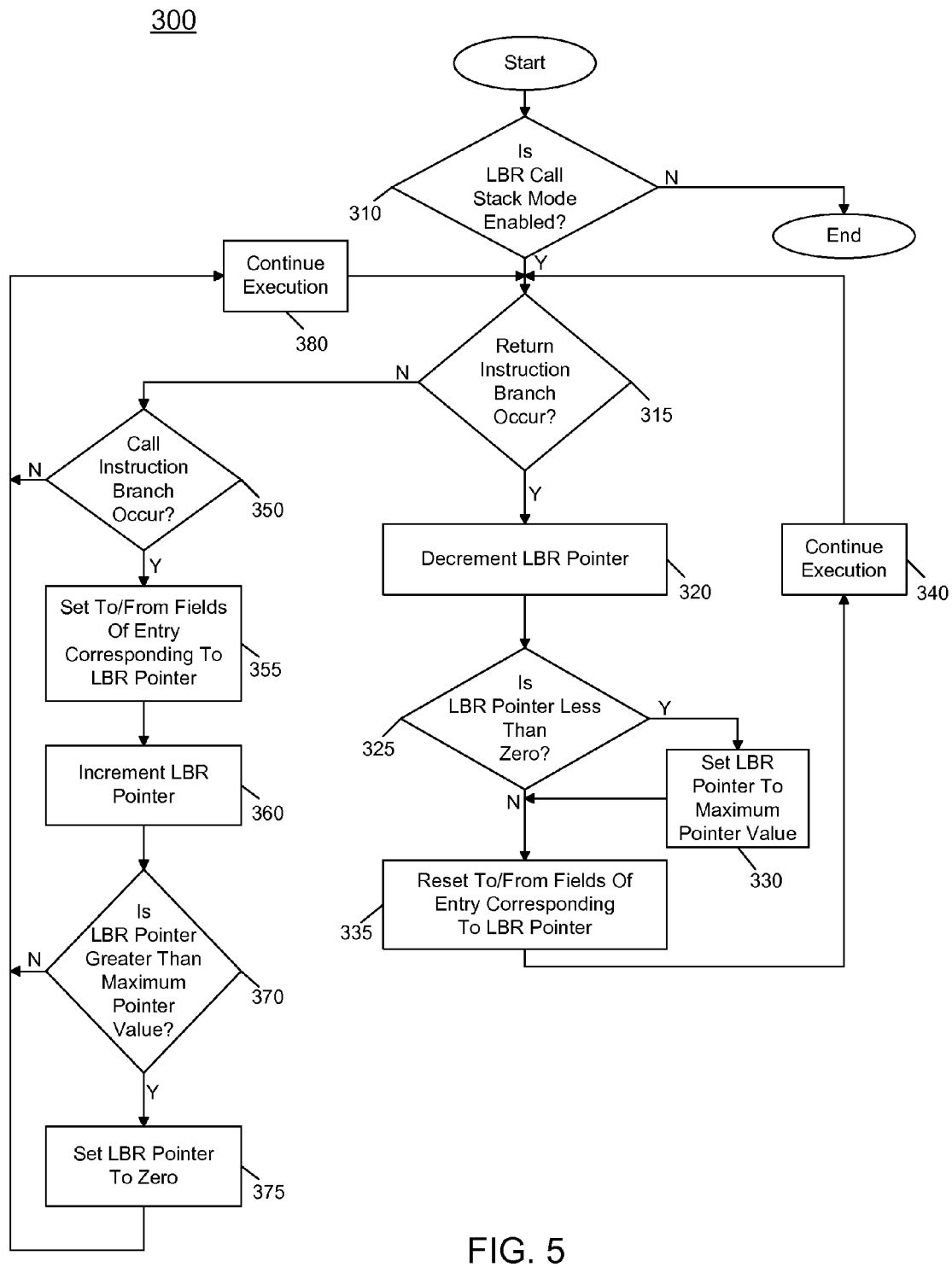
FIG. 5 is a flow diagram of operation in accordance with an embodiment of the present invention.

Referring now to FIG. 5, shown is a flow diagram of LBR operation in accordance with an embodiment of the present invention. More specifically, method 300 shown in FIG. 5 may be used to control operation of the LBR stack in a call stack mode. In various embodiments, method 300 may be executed by logic associated with the LBR unit, which may be dedicated LBR logic or can be shared logic of a performance monitor unit.

As seen in FIG. 5, method 300 may begin by determining whether LBR call stack mode is enabled (diamond 310). If not, the method may conclude and typical LBR operation can occur to store information regarding taken branches. For call stack mode, control passes to diamond 315 to determine whether a return instruction branch has occurred. If so, control passes to block 320 where an LBR pointer, which corresponds to the LBR entry to be next accessed, is decremented. Then it may be determined at diamond 325 whether this pointer is less than zero. If so, control passes to block 330, where the pointer is set to its maximum pointer value. Control thus passes to block 335, where the fields of the entry corresponding to the LBR pointer are cleared or reset. That is, because this branch causes return from a function call, the LBR entry associated with the call to the function is thus cleared so as to not pollute the LBR and to enable collection of an accurate call stack. Next, further program execution continues at block 340.

Referring still to FIG. 5, if instead a given instruction is not a return instruction branch, control passes to diamond 350 where it may be determined whether a call instruction branch occurs, namely a function call to a particular function. If so, control passes to block 355 where the to/from fields of the entry corresponding to the current LBR pointer may be set to thus indicate the addresses associated with this function call. Next, the LBR pointer may be incremented (block 360). If it is determined that the LBR pointer is greater than its maximum pointer value (at diamond 370), control passes to block 375, where the LBR pointer may be set to zero. Control then passes to block 380 where continued execution of the program occurs.

In the embodiment shown in FIG. 5, understand that the LBR pointer points to the next LBR entry to be filled with call instruction information. Thus on a call instruction, information is written into the entry and then the pointer is updated. Similarly, on a return instruction, the pointer is first adjusted, and then the entry corresponding to the adjusted pointer value is cleared. Instead in other embodiments, the LBR pointer may point to the last call instruction, rather than the next LBR entry to be filled with a call instruction. In such implementations on a call, the pointer may first be updated and then information written into the pointed-to entry. Accordingly, on a return instruction, the entry may be cleared and then the pointer can be adjusted.

Note also that the implementation shown in FIG. 5 is with regard to a call stack mode in which a backing store is not provided. That is, in the absence of a backing store, when the entries of the LBR unit are full, the pointer value is adjusted to thus cause entries beginning at the head of the LBR stack to be overwritten. Although shown with this particular implementation in the embodiment of FIG. 5, understand the scope of the present invention is not limited in this regard.

For example, in some embodiments certain types of calls can be filtered from being stored within the LBR during call stack mode. As one example, zero-length calls (e.g., having an opcode: E8 00 00 00 00) can be filtered to ensure they are not stored in the LBR since they do not have a matching return and will result in a dropped call stack in post processing. To store and recover stacks that are larger than the LBR, embodiments may write the LBRs into a backing store (which can be located in a cache, system memory or other storage) upon overflow of the LBR call stack so that overwriting of a valid LBR can be avoided, e.g., if the LBR pointer is adjusted as shown in blocks 330 and 375 above. Instead, at these points, a write to the backing store can be performed. As one example, new calls and returns deeper in the call stack than the LBRs can track, can write to the memory. Or, preferably, the contents of the LBRs are stored out to the memory while potentially resetting the LBRs. Then future calls and returns use the LBRs, and post-processing uses those entries stored in memory as the foundation of the call stack with the LBR contents being the recent entries. Then when the current LBRs underflow, meaning the call stack depth has dropped, the entries in memory could be swapped back into the LBRs. This swapping to and from the backing store does not have to be done at the overflow (MAX LBR) and underflow (MIN LBR) boundaries, and can be done with hysteresis to guarantee some free space in the LBRs as well as some call history, e.g., via a underflow pointer into the LBRs to specify the base of the tracked call stack, such that the mechanism knows where to restore entries from the backing store in order to provide this hysteresis.

In such implementations, entries from the backing store can be read into the LBRs (full size of LBRs) upon underflow of the LBR call stack. Some embodiments may further provide a mechanism to detect non-matching call/returns so the corresponding LBR entries can be cleared. For example, assume a long chain of calls occurs, where all returns are not executed. In such an embodiment, entries corresponding to the abandoned calls may be cleared to avoid pollution of the call stack entries. For example, assume a chain of calls from a FuncA to a FuncX (inclusively) which in turn returns to FuncA, and during FuncX an event of interest occurs such that a call stack may be desired to be obtained. In various embodiments, a mechanism may be provided to be able to clear the non-returning function calls to FuncB to FuncX−1 to thus only maintain in the call stack the desired entries. In this way, known cases such as pushing a new return address onto the stack and exception handling can be detected without post-processing.

Referring now to Table 2 is pseudo-code for a call stack mode in accordance with an embodiment of the present invention, which generally shows the operations performed in the flow diagram of FIG. 5.

TABLE 2

```
if (LBR Call Stack Implementation is Enabled)
{
        if (return instruction branch)
        {
           Decrement the LBR pointer
           if (LBR pointer < 0)
           {
              set LBR pointer to MAX_LBR-1
           }
           Set the LBR_TO and LBR_FROM fields at the
           LBR pointer to zero (0x0 invalidating the call)
        }
        else if (call instruction branch)
        {
           Set the LBR_TO and LBR_FROM with call site and call
           target
           Increment the LBR pointer
           if (LBR pointer >= MAX_LBR)
           {
              set LBR pointer to 0
           }
        }
}
MAX_LBR = number of LBR entries
LBR_TO = Site from the call
LBR_FROM = Landing site of the call
```

Embodiments thus provide a low latency methodology to gain an accurate call stack to any event of interest, in which its accuracy is inherent since it is the actual call stack to an event firing in the performance monitoring unit. Note that the most frequent call stack to a function is not always the call stack to when the issue of interest is occurring in a function.

Figure 6A:
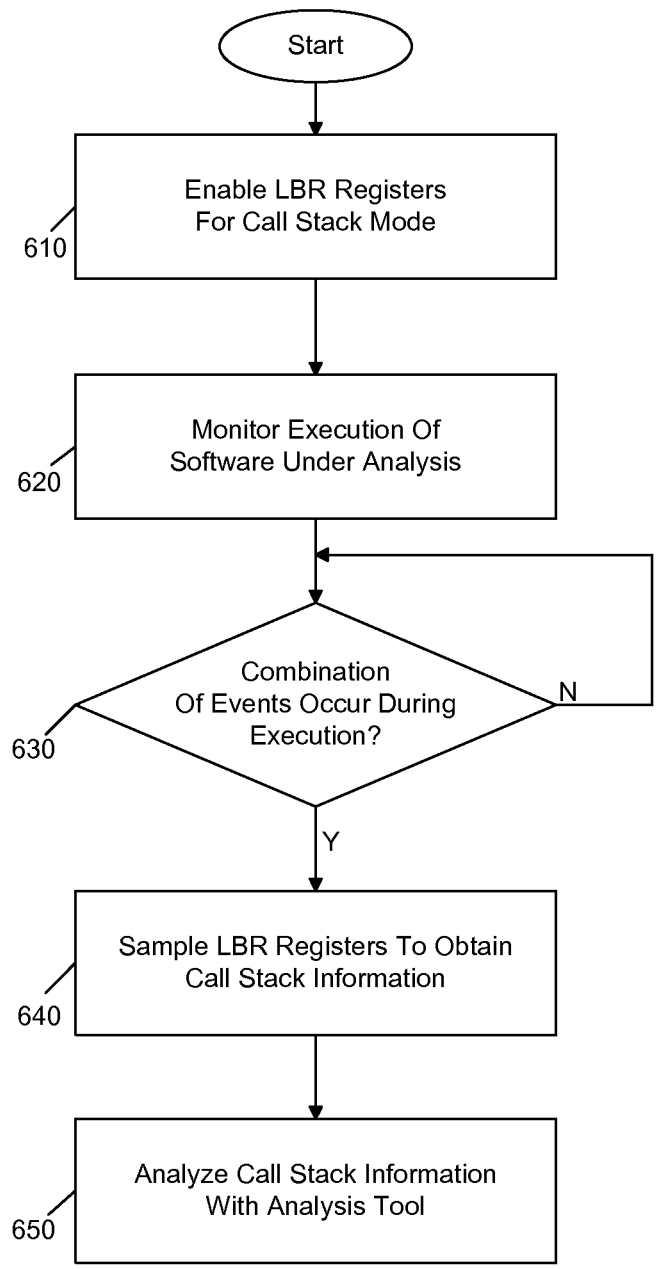
FIG. 6A is a flow diagram of a method for analyzing code using a software analyzer that provides for call stack recording in accordance with an embodiment of the present invention.

Thus embodiments may be particularly applicable to analysis that is performed on code, e.g., by a code analysis tool such as a software analysis tool that is used to analyze code under development. Referring now to FIG. 6A, shown is a flow diagram of a method for analyzing code using a software analyzer that provides for call stack recording in accordance with an embodiment of the present invention. As shown in FIG. 6A, method 600 may be implemented within a software analysis tool to enable a developer to analyze a program for various information.

As seen, method 600 may begin by enabling an LBR register mechanism for call stack mode (block 610). Such enabling may be as discussed above, where the control logic for the LBR registers may implement the storage (and clearing) of filtered information, namely calls that have not had a corresponding return instruction executed.

After this the set up and any other housekeeping tasks of the software analysis tool, the code under analysis, e.g., a multi-threaded application under development, may be executed (block 620). During such execution, monitoring may occur, e.g., various counters may be updated responsive to different events occurring during the code execution such as cache misses, lock contention and so forth.

Control then passes to diamond 630, where it can be determined whether a combination of events has occurred during execution. While the scope of the present invention is not limited in this regard, such combination of events may correspond to a triggering of one or more events such as performance counter overflows, performance monitoring interrupts, debug interrupts, a software instrumentation point, or so forth.

If so, control passes to block 640 where the LBR registers may be sampled to obtain call stack information. Because the LBR registers have been configured for call stack mode, only the desired information is obtained, namely the call stack to the triggering combination. Based on this information obtained, analysis may be performed (block 650) to determine whether a flaw in programming caused the combination of events to occur, among other considerations. Although shown with this high level view in the embodiment of FIG. 6A, understand the scope of the present invention is not limited in this regard.

Determining highly contended user-level locks in an application is an example where an exact call stack to a performance monitoring event can provide useful software analysis/debugging information. For example, the number of snoop responses to a modified cache line (e.g., a so-called HITM response) referenced by an atomic instruction can be used to find locks that are highly contended. Finding the most frequent call stack to the function containing the lock may be insufficient to determine what is causing undesired cache trashing, since the most frequent call path to the lock is often not the call stack creating the most contention. Only by finding the most frequent call stacks to the HITM events on the locking instruction pointer can a developer determine which locking paths are the most contended.

Figure 6B:
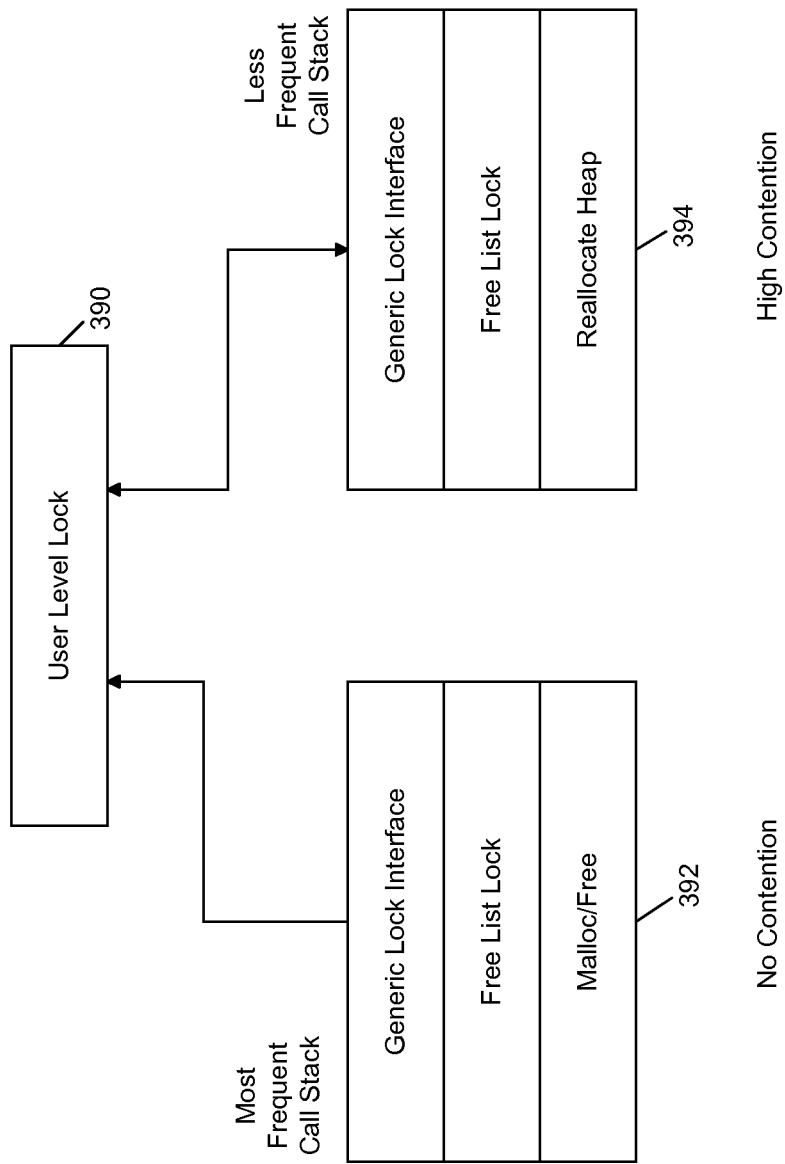
FIG. 6B is an illustration of different call stacks to an event of interest.

FIG. 6B is a block diagram detailing a performance issue debugged for an application's locking layer. As seen in FIG. 6B, the most frequent path (shown as call stack 392) to a lock 390, namely a user-level lock accessed via a user-level instruction (e.g., an atomic instruction such as a so-called exchange (XCHG) instruction) did not represent the path of contention. Instead, an event collecting the HITM responses on the cache line containing the lock address was used to determine the path to the lock (shown as call stack 394) that created most of the contention on the locking layer. Thus FIG. 6B demonstrates that the most frequent path to a lock is not always the path that suffers high contention.

Embodiments differ from software instrumentation (which can track all calls within an application and provide call graphs as well as call stacks) and statistical sampling of call stacks within an application by periodically breaking into the application and walking a software call stack. These methodologies are very intrusive on performance and often cause the software to behave differently than it would under normal conditions. In addition, these methodologies provide the most frequent call stacks to a point of interest, which may not necessarily represent the call stacks to an event of interest found using a performance monitoring unit, and further they are platform specific implementations that have to be maintained for each different version of an operating system (OS) and often require that the binaries be built in a particular fashion to maintain stack frames, etc.

Figure 7:
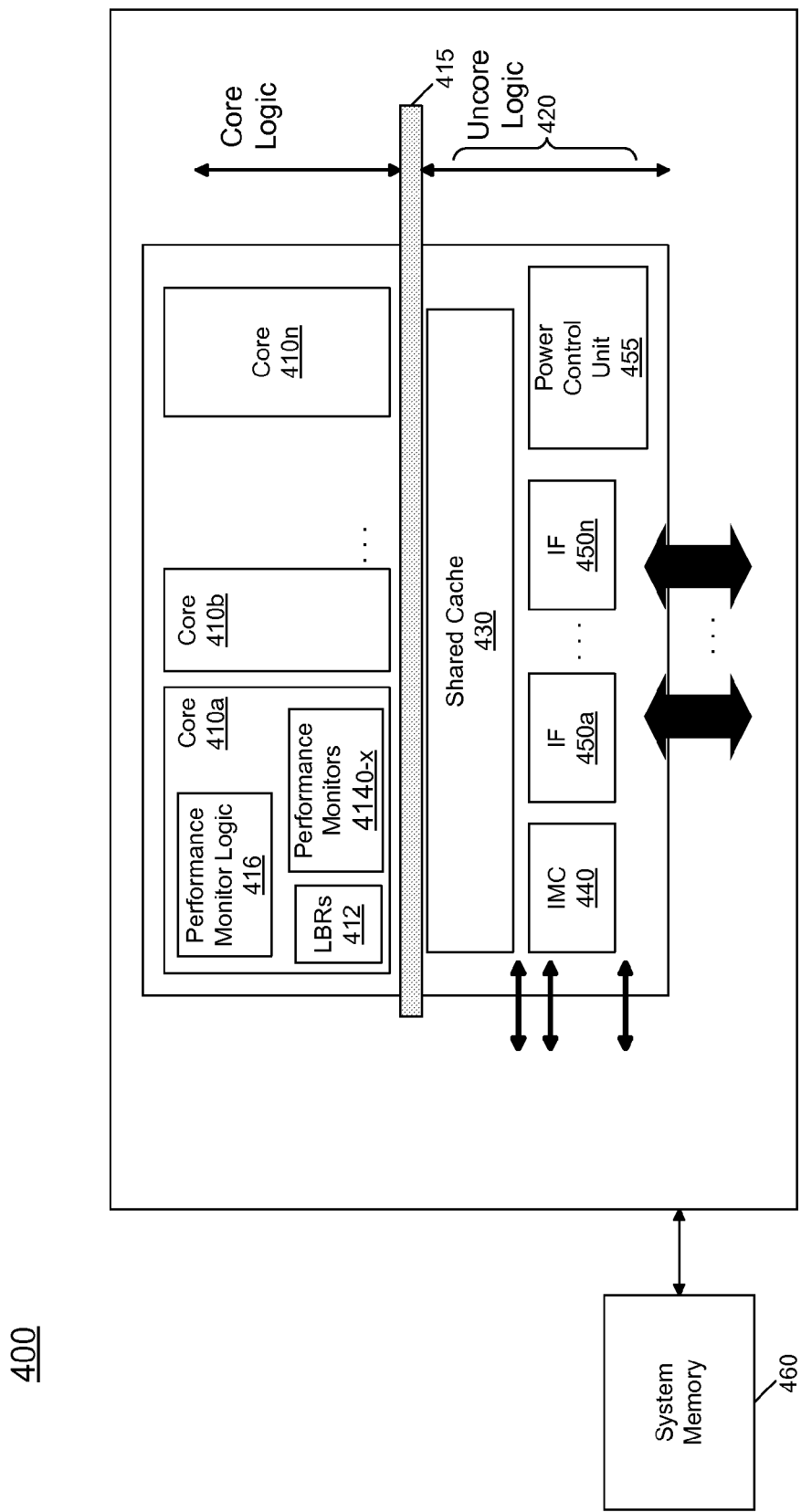
FIG. 7 is a block diagram of a processor in accordance with an embodiment of the present invention.

Referring now to FIG. 7, shown is a block diagram of a processor in accordance with an embodiment of the present invention. As shown in FIG. 7, processor 400 may be a multicore processor including a plurality of cores $410_a$-$410_n$. In one embodiment, each such core may include a pipeline with, e.g., front end units, out-of-order logic, execution units, and backend units such as retirement logic. In addition as described above each core may include various counters which can be implemented as registers such as machine specific registers, performance monitors, or so forth. Specifically with reference to the above-described performance monitoring and LBR call stack modes, each core may include a set of LBRs 412 which can be controlled via performance monitor logic 416 to execute in a call stack mode. When executing in this mode, branches other than calls and returns are filtered and furthermore, only call instructions are stored in the LBRs. Also, on a corresponding return from a called function, the call instruction is removed from its LBR entry. As further seen in FIG. 6, each core may further include performance monitors $414_0$-$414_x$ which can be a set of counters, timers or other components to enable monitoring of different events as controlled by, e.g., configuration registers of performance monitor logic 416. Performance monitor logic 416 may be configured to obtain a call stack from a corresponding LBR 412 on occurrence of a given event trigger which in some embodiments can correspond to a combination of occurrences within the system, such as triggering of multiple counter thresholds, interrupts or so forth.

The various cores may be coupled via an interconnect 415 to a system agent or an uncore 420 that includes various components. As seen, the uncore 420 may include a shared cache 430 which may be a last level cache. In addition, the uncore may include an integrated memory controller 440, various interfaces 450 and a power control unit 455, which may be used, in some embodiments to enter and exit from low power states independently of the OS. As seen, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 7, the scope of the present invention is not limited in this regard.

Figure 8:
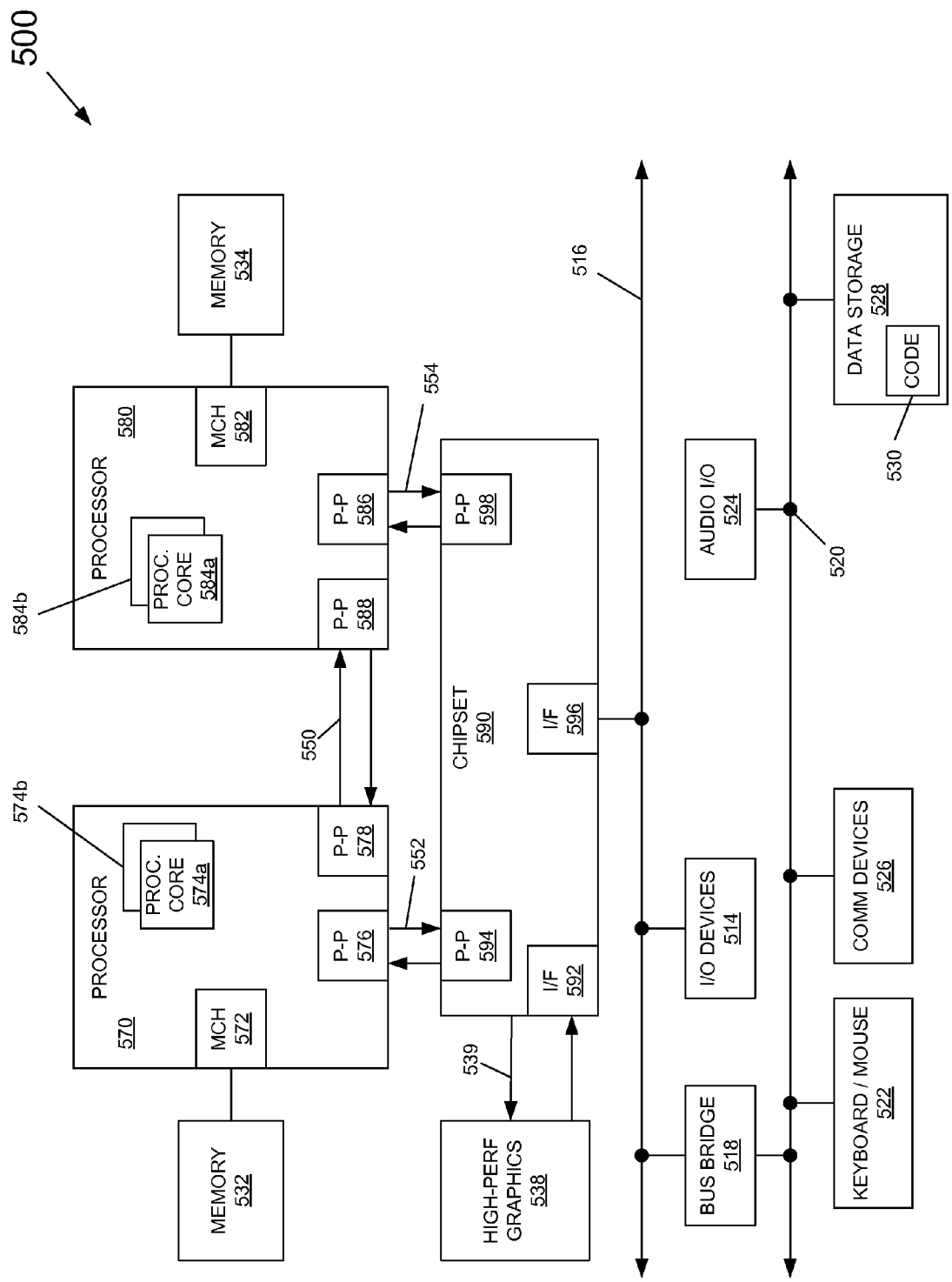
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 500 is a point-to-point interconnect system, and includes a first processor 570 and a second processor 580 coupled via a point-to-point interconnect 550. As shown in FIG. 8, each of processors 570 and 580 may be multicore processors, including first and second processor cores (i.e., processor cores 574a and 574b and processor cores 584a and 584b), although potentially many more cores may be present in the processors. Each of the cores may include a set of LBRs that can be configured for a call stack mode of operation as described above, along with performance monitor logic, also discussed above.

Still referring to FIG. 8, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 8, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 8, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 8, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, e.g., to perform power profiling in accordance with an embodiment of the present invention. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    an execution unit;
    a plurality of registers coupled to the execution unit, each of the plurality of registers to store at least one of source and destination address information of a branch taken during program execution; and
    a logic coupled to the plurality of registers to control the plurality of registers to operate:
        in a call stack mode to cause storage in the plurality of registers of call information of one or more functions to provide a call stack to an event, wherein in the call stack mode, a call to a leaf function is to be removed from a register on return from the leaf function; and
        in a second mode to cause storage in the plurality of registers of branch records for taken branches.

2. The processor of claim 1, wherein the processor is to preserve a sequence of nested function calls using information obtained from the plurality of registers.

3. The processor of claim 1, wherein the logic is to cause source and destination address information of a first call instruction to be stored in a first entry of the registers, the first call instruction to a first function.

4. The processor of claim 3, wherein the first entry is to be cleared responsive to a first return instruction that returns control to a caller of the first function.

5. The processor of claim 1, wherein the processor further includes a performance monitor including a first counter to count occurrences of the event in the processor.

6. The processor of claim 5, wherein the performance monitor is to trigger collection of performance monitor information when the first counter reaches a threshold corresponding to a threshold number of the occurrences of the event.

7. The processor of claim 6, wherein the performance monitor is to further collect a state of the plurality of registers during the collection of the performance monitor information.

8. The processor of claim 7, wherein the state of the plurality of registers corresponds to the call stack to the event, the call stack to the event including only the call information of the one or more functions.

9. The processor of claim 1, wherein the call stack to the event is independent from a system call stack comprising a data structure having a plurality of stack frames each corresponding to a subroutine and including one or more passed parameters.

10. A method comprising:
    storing branch records for taken branches in a recording facility within a processor when the recording facility is enabled for a first mode;
    determining if a return instruction occurs during execution of an application when the recording facility within the processor is enabled for a call stack mode;
    if so, clearing information stored in an entry of the recording facility within the processor, the recording facility having a plurality of entries each to store information associated with a branch operation, and adjusting a pointer of the recording facility in a first manner, the information associated with a prior call instruction;
    determining whether a call instruction occurs during the application execution when the recording facility within the processor is enabled for the call stack mode; and
    if so, storing information associated with the call instruction in an entry of the recording facility and updating the pointer in a second manner.

11. The method of claim 10, further comprising if the call stack mode of the recording facility is not enabled, not clearing the information stored in the entry responsive to occurrence of the return instruction.

12. The method of claim 10, further comprising:
    if the pointer reaches a maximum pointer value, causing entries of the recording facility to be stored to a backing store; and
    if the pointer reaches a minimum pointer value, causing entries of the recording facility to be restored from the backing store to the recording facility.

13. The method of claim 10, wherein the application includes at least one lock to control access to a value stored in a first location, and the recording facility entries are to store a call stack to an indication of contention to the first location.

14. The method of claim 10, further comprising decrementing the pointer on occurrence of the return instruction, and incrementing the pointer on occurrence of the call instruction.

15. A system comprising:
    a processor including a plurality of cores, at least one core of the plurality of cores including a performance monitor including a buffer to store, in a call stack mode, a call stack to an event of interest and a first counter to count occurrences of the event of interest, wherein the performance monitor is to trigger collection of performance monitor information when the first counter reaches a threshold corresponding to a threshold number of the occurrences of the event of interest, wherein the call stack is to be collected responsive to a trigger for the event of interest, the at least one core further including a logic to control the buffer to operate in the call stack mode and in a second mode to cause storage of branch record for taken branches; and
    a dynamic random access memory (DRAM) coupled to the processor.

16. The system of claim 15, wherein the call stack includes only calling information and is independent from a system call stack comprising a data structure having a plurality of stack frames each corresponding to a subroutine.

17. The system of claim 15, wherein in the call stack mode the buffer is to clear an entry to a call instruction for a leaf function on return from the leaf function.

18. The system of claim 15, wherein in the call stack mode, the call stack to be collected responsive to the trigger is the call stack to the event of interest, the event of interest corresponding to contention for a lock.

19. The system of claim 18, wherein the call stack is not a most frequent call stack to the lock.

20. The system of claim 19, wherein the trigger for the event of interest occurs when a count of a number of modified hit messages for a memory location including the lock reaches a threshold.

21. An article comprising a machine-accessible storage medium including instructions that when executed cause a system to:
 enable, in a call stack mode, a recording facility within a processor to store call information and not return information for functions of a multi-threaded application;
 execute the multi-threaded application on the processor;
 sample the recording facility to obtain the call information responsive to occurrence of an event trigger during the execution; and
 enable, in a second mode, the recording facility to store branch records for taken branches.

22. The article of claim 21, further comprising instructions that when executed enable the system to analyze the call information using an analysis tool.

23. The article of claim 21, further comprising instructions that when executed enable the system to determine if a return instruction to a first function occurs during the execution, and if so, to clear call information stored in an entry of the recording facility associated with a prior call instruction from the first function.

24. The article of claim 21, wherein the event trigger corresponds to at least one of a performance counter overflow, a performance monitoring interrupt, a debug interrupt, and a software instrumentation point.

* * * * *